United States Patent [19]

Williams

[11] 4,024,868

[45] May 24, 1977

[54] PERMANENT ANEURYSM CLAMP

[75] Inventor: Robert W. Williams, 3201 S. Maryland Parkway, Las Vegas, Nev. 89109

[22] Filed: Oct. 6, 1975

[21] Appl. No.: 619,703

Related U.S. Application Data

[63] Continuation-in-part of Ser. No. 546,209, Feb. 3, 1975, now Pat. No. 3,996,937.

[52] U.S. Cl. .................... 128/325; 024/255 SL; 128/346; 251/010

[51] Int. Cl.[2] .................................. A61B 17/12

[58] Field of Search ... 024/255 SL, 255 R, 261 C, 261R; 128/325, 346; 251/010

[56] References Cited

UNITED STATES PATENTS

| | | | |
|---|---|---|---|
| 243,629 | 6/1881 | Sanderson | 024/261 R UXR |
| 469,191 | 2/1892 | Sooshny | 024/261 C UXR |
| 853,996 | 5/1907 | Roundy | 024/261 C UXR |
| 939,520 | 11/1909 | Leyner | 024/261 R UXR |
| 1,236,282 | 8/1917 | Fontaine | 024/261 R UXR |
| 2,127,257 | 8/1938 | Hornberger | 024/261 C XR |
| 3,368,187 | 2/1968 | Faul et al. | 024/261 R XR |
| 3,705,586 | 12/1972 | Sarracino | 128/346 |
| 3,866,611 | 2/1975 | Baumrucker | 128/346 |
| 3,805,792 | 4/1974 | Cogley | 128/325 |

*Primary Examiner*—Channing L. Pace
*Attorney, Agent, or Firm*—Jerry R. Seiler

[57] ABSTRACT

An aneurysm clamp comprises three elongated and parallel rod members secured to a biased handle for opening and closing the clamp, the handle being normally biased in a closed position whereby the rod members lie along a single plane and are spaced apart substantially uniformly along their length with first and second rods lying on each side respectively of a third rod, the first and second rods being joined at their ends opposite the handle by a bridge member, and a finger at the end of said third rod member overlying bridge member, and means for securing the bridge end of the clamp in a closed position.

13 Claims, 6 Drawing Figures

PERMANENT ANEURYSM CLAMP

BACKGROUND OF THE INVENTION

This application is a continuation-in-part of my application Ser. No. 546,209, filed Feb. 3, 1975, now Patent 3,996,937.

Although a number of aneurysm clips or clamps are available for vascular and neurological surgery, all of such devices operate by pinching the vascular aneurysm neck tissue which is often, if not always, traumatic, causing tissue necrosis and breakdown and resulting potentially in rupture of the aneurysm neck. Such pinch-type clamps also have the disadvantage of having at least slightly different spacing and concomitant pressure variation along the clamp member length which result in excessive tissue damage or incomplete occlusion and possible leakage of blood into the aneurysm sac. Moreover, presently known clips occasionally may slip, both axially and longitudinally along the closure member or clamp blade. Such a movement may result in the clamp becoming removed altogether or further damaging the aneurysm neck tissue. In addition, presently known clips are secured against opening due to vascular pressure by the strength of the spring mechanism which seeks to maintain the clamp members in a closed position. However, the requirement of increased spring tension on the clamp members to prevent its opening often causes them to apply excessive squeezing pressure against the tissue walls, thereby increasing the danger of cell damage and necrosis of the vessel wall leading to rupture of the neck as previously described. It is to the substantial elimination of these problems that the present invention is directed.

SUMMARY AND OBJECTS OF THE INVENTION

It is an object of the present invention to provide an atramatic occlusion device which does not pinch the vascular aneurysm neck tissue in forming the occlusion. It is a further object to provide a device having stop means which will not allow the neck of the aneurysm to slip out of the open clamp end. It is still another object to provide a permanent aneurysm clamp which will not slip from side to side when placed in the proper position. It is still a further object to provide a clamp which can be secured for permanent intracranial placement by a fastening means applied directly on the properly placed clamp thereby securing it from further slippage or opening without increasing the pressure on the vessel walls and preventing necrosis and trauma to the neck. These as well as other objects will be evident from the following detailed description.

DETAILED DESCRIPTION OF THE INVENTION

The permanent aneurysm clamp of the present invention has a number of similar features with the clamp disclosed in my aforesaid co-pending application regarding the handle portion and clamping means, and the description thereof is incorporated herein by reference. Specifically, handle portion 20 comprises upper and lower handle members 22 and 24 biased to be spread apart thereby biasing the clamp members to which they are connected in a closed position. The shape of the handle members is not especially critical. Those shown are of convenient design and can be readily grasped by the fingers of a surgeon or operated by a delivery means. The spring member will, by selecting a material having a suitable diameter and memory, provided enough closing pressure to overcome the internal vascular pressure of vessels of varying sizes within physiological ranges.

Figure 4:
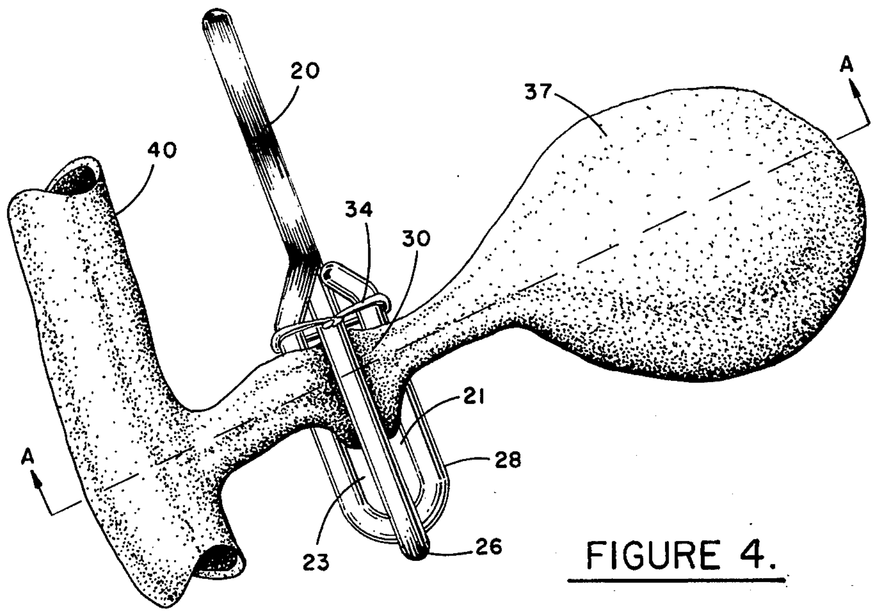
FIG. 4 is a partial perspective view of the top of the clamp in a closed condition on a vascular aneurysm neck and permanently closed with a fastening member.
Figure 5:
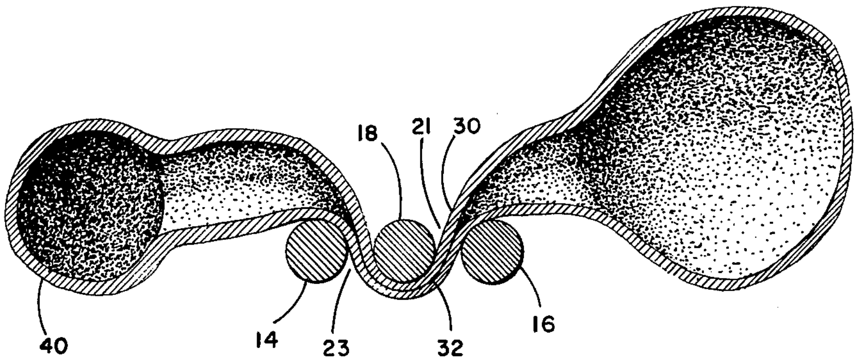
FIG. 5 is a sectional elevation taken along lines A—A of FIG. 4.

In the preferred embodiment shown, three elongated clamp members 14, 16 and 18 comprise the clamping means. In a closed and normal rest condition these clamp members are substantially parallel and lie along a single plane as illustrated especially in FIGS. 1 and 5. Moreover, the clamp members are positioned so that spaces 21 and 23 on either side of middle clamp member 18 are uniform substantially along the entire length between the interior surfaces of parallel outside clamp members 14 and 16. The importance and purpose of this uniformity is illustrated in FIGS. 4 and 5 wherein the aneurysm neck 30 between aneurysm sac 37 and vessel 40 is occluded by uniformly engaging and restricting the tissue of the aneurysm neck without exerting substantial pressure sufficient to break down the involved tissue thereby causing necrosis and potential rupture. Accordingly, the three elongated clamp members being parallel in the closed position achieve uniform closure and occlusion of the aneurysm entirely along the contact area of the tissue with the clamp members.

Figure 1:
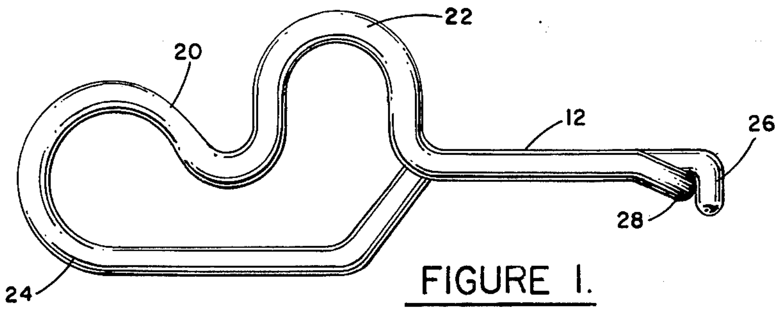
FIG. 1 is a side elevational view of the clamp of the invention in a closed condition.

In a preferred embodiment, the device is formed of a single length of spring wire or rod including the handle members, again, the latter biased to urge the clamp members in a closed position. As particularly illustrated in FIGS. 2, 4 and 5, the two outside clamp members 14 and 16 form and define an elongated cavity between their interior walls to receive the third clamp member 18. The outside members are joined by a bridge 28, preferably U-shaped and angled or bowed downwardly from the plane extending along the length of the clamp members as shown in FIG. 1. In addition, at the end of middle clamp member 18 is a downwardly extending finger 26 which overlies bridge 28 and rests against the bridge to provide an automatic stop for the biased clamp members in the closed position. As is also observed in FIG. 3, the underside of clamp member 18 and finger 26 form an elbow having a shape so as to not only rest against bridge 28 in a proper position for aligning the clamp members shown in FIGS. 1 and 5, but also to prevent the aneurysm neck from sliding out of the clamp. In other words, because finger 26 extends downwardly over the bridge member, the forward clamp end is closed in a manner such that the device cannot be removed by sliding a vessel or aneurysm neck through or past those forward end members. More preferably, finger 26 also is of a length so as to extend downwardly, at least even with the bottom edge of the bridge or may extend somewhat therepast.

Preferably, the bridge will be angled downwardly from the common plane of the clamp members so that its upper and forward most surface lies evenly across from the bottom surface of the clamp members. In other words, the bridge will be bowed or depressed downwardly equal to the thickness of the clamp members whereby its upper surface will lie along a single plane extending along the bottom clamp member surfaces. The low point in the bridge must also be centered along the bridge length precisely between the two outside clamp members so that the middle clamp member at rest thereon will be centered and evenly spaced in the closed position.

It should be appreciated that different designs may be used for the bridge and finger members other than those shown to achieve the desired characteristics of providing a stop for the biased clamp members in the closed position as well as means on the end of the middle clamp member cooperating with the bridge so as to prevent the clamp from sliding off of a vessel or aneurysm neck. For example, the bridge may be provided with a more pronounced means for receiving and maintaining the middle clamp member in a closed position such as a notch or groove, cut or formed into the bridge. It is also preferred that finger 26 is rounded as shown so as to prevent any sharp edges or surface which could inadvertently injure or abrade tissue. Such a feature will prevent injury even if the forward end of bridge 28 or finger 26 contacts other structures when the clamp is being placed.

Figure 3:
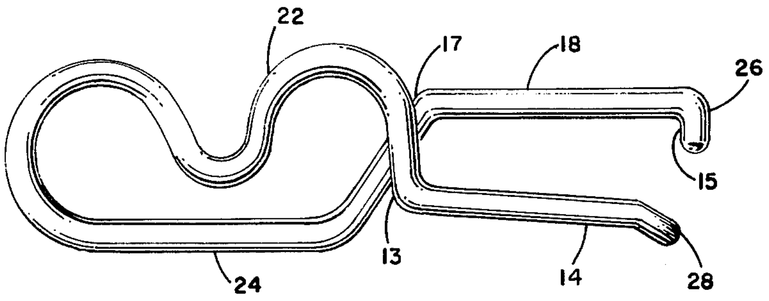
FIG. 3 is a side elevational view of the clamp of FIG. 1 in an open condition.

FIG. 3 illustrates opening of the device with upper and lower handle members 22 and 24 respectively compressed to overcome the spring bias. This opens the clamp members in a scissor-like manner whereby middle clamp member 18 is urged upwardly and outside clamp members 14 and 16 are urged downwardly to form an opening therebetween into which the aneurysm neck or vessel to be occluded is received. Once the clamp is in place, the operator simply releases the handle thereby allowing the clamp members to automatically close at which time the vessel will be occluded in a manner illustrated in FIGS. 4 and 5.

It will be noted in the preferred embodiment shown, that outside clamp member 16 is directly connected to first or upper handle portion 22 while middle clamp member 18 is similarly directly connected to second or lower handle portion 24. Other means for achieving the same purpose may be used. Thus, the specific shape or bend of the wire or rod material of which the device is preferably produced may be modified from that illustrated to achieve the same function and purpose. It will also be noted that in the embodiment shown, a single length of wire or rod is formed extending between terminal ends 26 and 35 so that the device is unitary in its preferred construction thereby lending simplicity to its design as well as in production and ease of manufacture.

Figure 2:
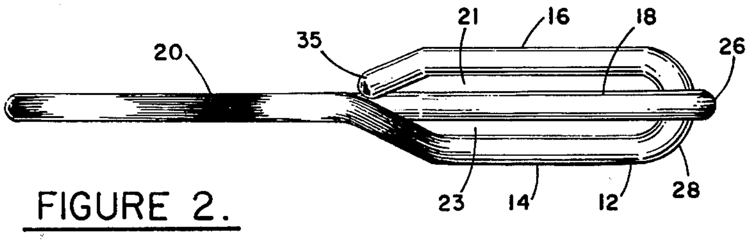
FIG. 2 is a top view thereof.

Observing also FIGS. 4 and 5, there is shown the device in position to occlude vessel 30 which lies over a portion of the surface of each of the outside clamp members 14 and 16 and extends around the opposite surface of middle clamp member 18. Occlusion occurs as vessel walls 30 and 32 collapse and are forced toward one another with the interior vessel wall surfaces meeting substantially along the length thereof lying between the facing interior surfaces of the outside clamp members 14 and 16. Moreover, since there are not opposing surfaces squeezing the vessel walls therebetween as is normally found in other types of clamps or clips, there is no danger of the vessel walls being unduly compressed or pinched which could cause damage to the fragile cells and nutritional capillaries in the vessel walls. At the same time, with this occlusion extending substantially and uniformly along the entire area lying between the interior clamp member surfaces, fluid and especially blood is forced therefrom to prevent clotting. Thus, not only is the occlusion and mating of the vessel walls uniform because of parallel disposition of the clamp members and uniform separation therebetween, but prevention of stretching of the vessel is achieved because of the automatic stop feature where terminal end 26 overlies and rests on bridge member 28 as shown in FIGS. 2 and 4. Without such a stop feature, the bias spring effect of the handle could cause the middle clamp member 18 to pass entirely through its co-planer disposition with outside clamp members 14 and 16. In addition, because of the cooperating angular displacement of the bridge and middle clamp member end, the latter is self centering, even where the clamp is made of relatively thin wire.

It has been found that different sized clamps will be more or less effective on different sized collapsible aneurysm necks or vessels especially due to the spacial relationship between the clamp members. Preferably, the distance between the facing inner surfaces of the outside and inside clamp members, i.e., distance across each space 21 and 23 is between about ⅓ and about 2 times the diameter of one of the clamp members. More preferably, this distance is between about ½ and about equal to the clamp member diameter. However, the proper sized device must also be used for different vessel sizes so that the distance between the clamp members, i.e., between their interior and opposing surfaces or the distance across spaces 21 and 23 is between about ½ and about 1½ times the double wall thickness of the vessel being occluded. Where the space is less than the double wall thickness, because of the elasticity of the vessel wall tissue, there will be but slight vessel wall stretching easily within physiological tolerance as the wall narrows itself to occupy the spaces 21 and 23. Yet, where the space is unduly small or narrow for the vessel, undue stretching may occur giving rise to vessel wall damage and necrosis. On the other hand, where the space is too large and the vessel fits loosely therein, occlusion may not be satisfactory. Thus, preferably this distance between adjacent closure member surfaces is not greater than the thickness of both collapsed vessel walls, and yet is not less than about ⅔ the double collapsed wall thickness. However, the sizing or matching of clamps with vessels is critical to the extent that the distance between these opposing clamp surfaces is small enough to approximate or bring together the walls between the inner surfaces of 14 and 16 as the tube passes around member 18. The passage of the vessel through the path outlined in FIG. 5 allows for expression of the anatomical fluid both proximal and distal to members 16 and 18 resulting in the occlusive effect without allowing pooling and stagnation of the fluid in spaces 21 and 23 which could lead to complications such as retrograde clotting (thrombosis) into the parent vessel, a most undesirable physiological condition.

Figure 6:
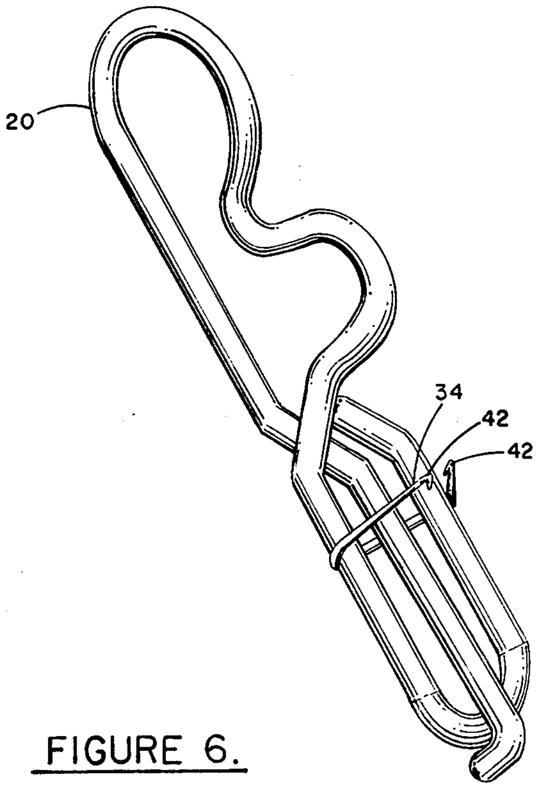
FIG. 6 is a view showing the clamp of the invention in a closed condition with a fastening ring around the clamp members prior to securing the clamp.

When the clamp has been properly placed on the aneurysm neck or other vessel to be occluded and further movement of the clamp is not desired, a fastening member 34 is applied as shown in FIGS. 4 and 6. Any suitable fastening member may be used to form a barrier around the proximal portion of the clamp members to prevent them from being urged in an open position by internal vessel pressure. Accordingly, fastening member 34 which may be in the form of a clip or similar device as shown is placed and secured on the clamp so that it firmly presses against both upper and lower clamp member surfaces forcing them in the fully closed parallel position if they are not already so. A fastening member fully compressed against the clamp members will also prevent the fastening member itself from slipping in either direction since it is firmly secured by the friction forces between the fastening member and the clamp members. The fastening member shown specifically in FIG. 6 also has ends 42 which may be further secured around the outside clamp member and will assist in securing the fastening member in place. As shown, the ends 42 of fastening member 34 have hooks for conveniently being snapped in the secured position. However, the member may be provided with any other suitable and equivalent fastening means. Thus, this specific fastening member is not so critical so long as it may be placed over the clamp members and secured to prevent them from being opened, maintain the parallel closed position shown in FIGS. 4 and 5. Normally, some delivery instrument may be used to conveniently place the fastening member on the clamp and further secure it in a secured position. Other designs of the fastening member than those shown may be used to achieve this same purpose.

In placing the clamp of the invention on an aneurysm as illustrated in FIG. 4, the clamp members are opened and the middle clamp member is placed over the aneurysm neck 30 until it is suitably in a position with the neck approximately mid-way between bridge 28 and angled portions 13 and 17 of the clamp members. Further adjustments may be made by applying pressure to the upper and lower handle members compressing them to slightly open the clamp members and this procedure may be repeated until the clamp is precisely placed where it is desired. At that time, fastening member 34 may be secured as previously described. The fastening member should be placed so that it involves or secured all three of the clamp members and does not interfere with the occluded aneurysm neck, or with surrounding tissue. After securing the locking member in place so that the clamp members are parallel and spaces 21 and 23 maintained for purposes as previously described, it is found that the aneurysm neck will not slip from over bridge 28, the clamp members cannot be opened within physiological ranges by internal vessel pressure, and the vessel wall does not necrose. Moreover, slippage of the clamp member either axially or longitudinally on the aneurysm neck does occur within physiological ranges when all criteria of proper occlusion are met as described and the fastening member has been affixed.

The specific type of material used in the clamp is critical only that it preferably has a spring-like composition with memory whereby the handle portion acts as a spring for automatically biasing opposing clamp members. Further, the material used is also preferably circular in cross-section, at least at the clamp member surfaces so that no sharp, angulated, or other surfaces which may injure tissue are exposed and also to minimize any stretching due to angulated surfaces in contact with tissue. Other materials such as nylon or synthetics with memory property may also be used. Regardless of material, the spring should be sufficient so as to maintain the aneurysm neck or other vessel closed against vessel pressure of about 150 mm. of Hg. However, since most aneurysms are clipped under hypotension, normally utilizing hypotensive agents which reduce vessel pressure to 70 mm. Hg, fully closing the clamp and occluding the vessel present no problems. Other advantages of using the instant device because of its characteristics will be evident to those skilled in the art.

I claim:

1. A clamp for occluding a vascular aneurysm comprising first and second elongated outside rods and a third elongated rod therebetween said rods being interconnected, spaced apart and parallel and having their respective elongated axes lying along a single plane when said clamp is closed, a means for moving at least one of said rods out of said plane for opening and closing said clamp, a bridge member secured to and extending between ends of said first and second rods, and a finger portion secured at an end of said third rod and extending over said bridge member and beyond said plane.

2. The clamp of claim 1 wherein said rods are spaced apart uniformly along their length when said clamp is closed.

3. The clamp of claim 2 wherein said second rod end and said finger form an elbow overlying said bridge and in abutment therewith when said clamp is closed.

4. The clamp of claim 3 wherein said bridge is bowed normal to and past said rod plane.

5. The clamp of claim 3 wherein a portion of said bridge extends beyond said rod plane a distance corresponding to the cross-section of said third rod.

6. The clamp of claim 1 including means for securing said clamp in the closed position.

7. The clamp of claim 2 including means for securing said clamp in the closed position.

8. The clamp of claim 7 wherein said securing means comprises a fastening member extending around said rods.

9. A clamp for permanently occluding a vascular aneurysm comprising:

(a) first, second and third elongated parallel rod members, (b) a handle secured to and cooperating with said rod members for opening and closing said clamp, said clamp being closed when said rod members lie along a single plane, and (c) a fastening member secured around said rod members adjacent said handle.

10. The clamp of claim 9 wherein said first and second rod members extend along each side of said third rod member and are uniformly spaced therefrom when said clamp is closed.

11. The clamp of claim 9 wherein said handle is biased to normally close said clamp.

12. The clamp of claim 10 including a bridge member secured to and extending between ends of said first and second rod members opposite said handle and a finger on the end of said third rod member opposite said handle for abutting against said bridge when said clamp is closed.

13. The method of occluding an aneurysm comprising opening the clamp of claim 9, placing said clamp over the neck of an aneurysm whereby said first and second rod members lie on one side thereof and said third rod member on the opposite side, closing said clamp by releasing said handle, and securing a fastening member around said rod members whereby they cannot be opened by said handle.

* * * * *